United States Patent
Seo

(10) Patent No.: US 11,939,006 B2
(45) Date of Patent: Mar. 26, 2024

(54) STEER-BY-WIRE-TYPE STEERING APPARATUS

(71) Applicant: HL MANDO CORPORATION, Gyeonggi-do (KR)

(72) Inventor: Donghwan Seo, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 608 days.

(21) Appl. No.: 17/283,548

(22) PCT Filed: Oct. 16, 2019

(86) PCT No.: PCT/KR2019/013611
§ 371 (c)(1),
(2) Date: Apr. 8, 2021

(87) PCT Pub. No.: WO2020/080832
PCT Pub. Date: Apr. 23, 2020

(65) Prior Publication Data
US 2021/0387665 A1    Dec. 16, 2021

(30) Foreign Application Priority Data
Oct. 18, 2018 (KR) .......................... 10-2018-0124691

(51) Int. Cl.
*B62D 5/00* (2006.01)
*B62D 5/04* (2006.01)
(Continued)

(52) U.S. Cl.
CPC ........... *B62D 5/001* (2013.01); *B62D 5/0409* (2013.01); *B62D 5/0463* (2013.01); *B62D 6/10* (2013.01); *B62D 15/0215* (2013.01)

(58) Field of Classification Search
CPC ...... B62D 5/001; B62D 5/005; B62D 5/0409; B62D 5/0463; B62D 5/0469; B62D 6/10; B62D 15/0215
(Continued)

(56) References Cited

U.S. PATENT DOCUMENTS 7,726,439 B2 * 6/2010 Akuta ..................... B62D 6/02
                                                                         180/405
2003/0184072 A1   10/2003   Andonian et al.
(Continued)

FOREIGN PATENT DOCUMENTS

| CN | 1543409 | 11/2004 |
|----|---------|---------|
| CN | 108516011 | 9/2018 |

(Continued)

OTHER PUBLICATIONS

International Preliminary Report on Patentability for PCT/KR2019/013611 dated Apr. 14, 2021 and its English translation from WIPO (now published as WO2020/080832).
(Continued)

*Primary Examiner* — Minnah L Seoh
*Assistant Examiner* — Christopher B Wehrly
(74) *Attorney, Agent, or Firm* — Ladas & Parry, LLP

(57) ABSTRACT

The present embodiments relate to a steer-by-wire-type steering apparatus, and may provide a steer-by-wire-type steering apparatus comprising: an outer member which is rotated by a driving motor and has oblique grooves formed in the inner circumferential surface thereof; an inner member which is formed in a cylindrical shape and spaced inward from the inner circumferential surface of the outer member, fixed to a steering column, and provided with a guide part open in a radial direction; a sliding member, of which the outer surface is supported by the oblique grooves when the outer member rotates, and which moves along the guide part (Continued)

in an inward radial direction; and a support member which moves in the radial direction in association with the sliding member, and which supports the outer circumferential surface of the steering shaft and thereby prevents the steering shaft from rotating.

20 Claims, 10 Drawing Sheets

(51) Int. Cl.
*B62D 6/10* (2006.01)
*B62D 15/02* (2006.01)

(58) Field of Classification Search
USPC .......................................................... 180/402
See application file for complete search history.

(56) References Cited

U.S. PATENT DOCUMENTS

| | | | |
|---|---|---|---|
| 2014/0069224 | A1 | 3/2014 | Dimig et al. |
| 2018/0080426 | A1* | 3/2018 | Kuramochi ............ B62D 5/005 |
| 2019/0389503 | A1* | 12/2019 | Hwang ................. B62D 6/008 |
| 2020/0391784 | A1* | 12/2020 | Saito ..................... B62D 5/001 |

FOREIGN PATENT DOCUMENTS

| | | |
|---|---|---|
| DE | 10 2013 014 134 | 8/2013 |
| JP | 2002-195306 | 7/2002 |
| JP | 2010-167914 | 8/2010 |
| JP | 2010-274892 | 12/2010 |
| JP | 2015-96408 | 5/2015 |
| KR | 2002-0044360 | 6/2002 |
| KR | 10-2004-0017349 | 2/2004 |
| KR | 10-2009-0058797 | 6/2009 |
| KR | 10-2011-0006897 | 1/2011 |
| KR | 10-2018-0004920 | 1/2018 |
| KR | 10-2018-0028235 | 3/2018 |
| KR | 10-2018-0028566 | 3/2018 |
| KR | 10-2018-0095335 | 8/2018 |
| KR | 10-2018-0097327 | 8/2018 |
| KR | 10-2018-0107357 | 10/2018 |

OTHER PUBLICATIONS

Office Action dated Dec. 22, 2021 for German Patent Application No. 11 2019 005 187.3 and its English machine translation by Google Translate.

Notice of Allowance dated Jun. 15, 2023 for Korean Patent Application No. 10-2018-0124691 and its English machine translation from Global Dossier.

International Search Report for PCT/KR2019/013611 dated Jan. 23, 2020 and its English translation from WIPO (now published as WO2020/080832).

Written Opinion of the International Searching Authority for PCT/KR2019/013611 dated Jan. 23, 2020 and its machine English translation by Google Translate (now published as WO2020/080832).

Office Action dated Nov. 24, 2022 for Chinese Patent Application No. 201980068382.2 and its English machine translation by Google Translate.

* cited by examiner

STEER-BY-WIRE-TYPE STEERING APPARATUS

CROSS-REFERENCE TO RELATED APPLICATION APPLICATIONS

This patent application is the U.S. National Phase of PCT Application No. PCT/KR2019/013611 filed on Oct. 16, 2019, which claims priority in accordance with Article 119(a) of the U.S. Patent Law (35 USC § 119(a)) for Patent Application No. 10-2018-0124691 filed in Korea on Oct. 18, 2018, which all contents are incorporated into this patent application by reference. In addition, if this patent application claims priority for countries other than the United States for the same reason as above, all the contents are incorporated into this patent application as references.

TECHNICAL FILED

The present embodiments relate to a steer-by-wire type steering apparatus, more particularly, relate to a steer-by-wire type steering apparatus capable of preventing the rotation of a steering shaft when the rotation of a wheel reaches a maximum point or when the driver generates a steering torque excessively on the steering shaft than the reaction torque of a reaction force motor, so that improving the driver's steering feeling and steering stability.

BACKGROUND ART

In general, a power steering is developed and applied to provide convenience in driving operation by assisting the driver's steering wheel operation power, and power steerings were developed and applied by a hydraulic type using hydraulic pressure, an electric hydraulic type using both hydraulic power and motor power, and an electric type using only the electric power of a motor.

Recently, a steer-by-wire (SBW) type steering apparatus which allows the vehicle to be steered using an electric device such as a motor instead of removing mechanical connections such as a steering column or universal joint or pinion shaft between the steering wheel and the wheel has been developed and applied.

However, in the case of such a steer-by-wire type steering apparatus, since there is no mechanical connection between the steering shaft and the wheel, there may be a problem that the driver's steering wheel rotation can be infinitely operated, thereby deteriorating the driver's steering sense.

That is, when the rotation of the wheel reaches a maximum point (when the steering wheel or wheel is in a full-turn state in a general steering system) or when the wheel hits the curb of the road and cannot rotate anymore, there is a need to provide the corresponding information to the driver by preventing an additional rotation of the steering shaft.

DISCLOSURE

Technical Problem

The present embodiments are derived from the above-described background, and have an object of providing a steer-by-wire type steering apparatus capable of preventing the rotation of a steering shaft when the rotation of a wheel reaches a maximum point or when the driver generates a steering torque excessively on the steering shaft than the reaction torque of a reaction force motor, so that improving the driver's steering feeling and steering stability.

In addition, the purpose of the embodiments is not limited thereto, and other objects not mentioned will be clearly understood by those skilled in the art from the following description.

Technical Solution

According to the present embodiments, there may be provided with a steer-by-wire type steering apparatus including an outer member rotated by a driving motor and provided with an oblique groove formed on an inner circumferential surface, an inner member formed in a cylindrical shape provided on an inner side of the outer member, fixed to a steering column, and provided with a guide part opened in a radial direction, a sliding member whose outer surface is supported by the oblique groove when the outer member is rotated and is moved radially along the guide part, and a support member which is linked with the sliding member to move in the radial direction and supports an outer circumferential surface of a steering shaft to prevent rotation of the steering shaft.

Advantageous Effects

According to the present embodiments, in a steer-by-wire type steering apparatus, it is possible to prevent the rotation of a steering shaft when the rotation of a wheel reaches a maximum point or when the driver generates a steering torque excessively on the steering shaft than the reaction torque of a reaction force motor, so that the driver's steering feeling and steering stability may be improved.

MODE FOR DISCLOSURE

Figure 1:
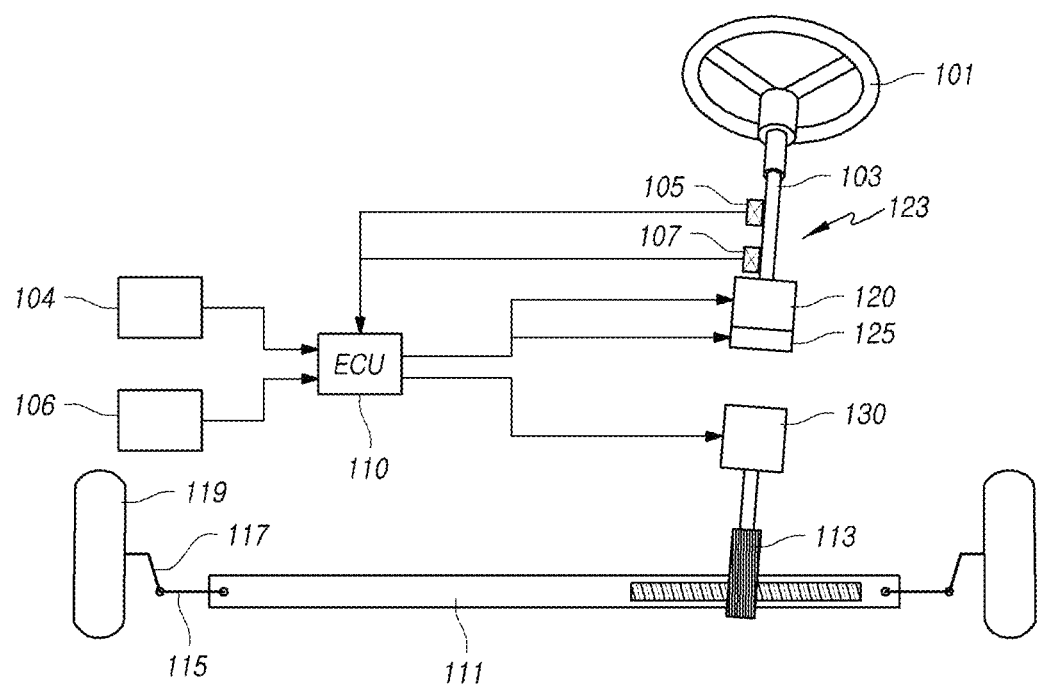
FIG. 1 is a schematic configuration diagram of a steer-by-wire type steering apparatus according to the present embodiments.
Figure 2:
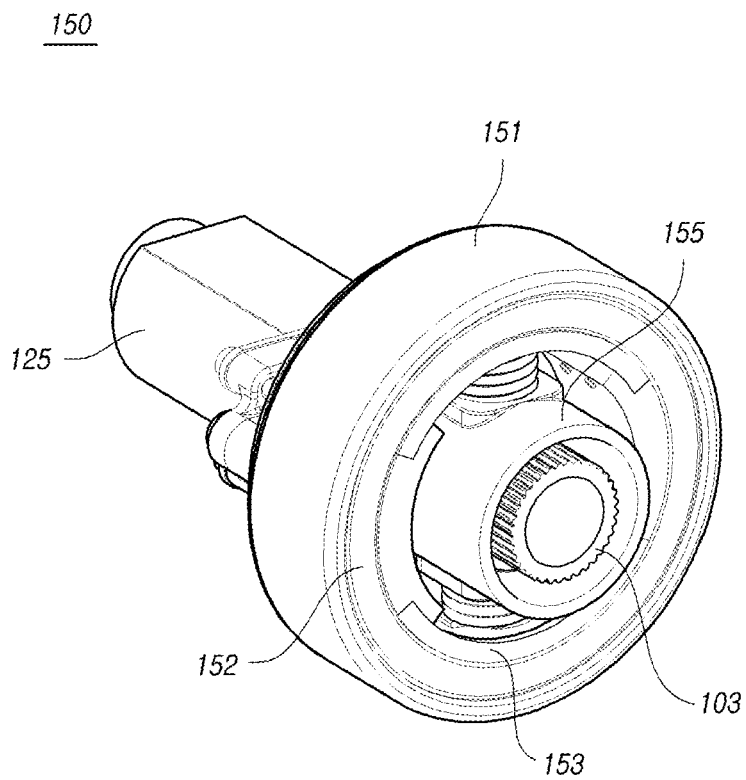
FIGS. 2 to 5 are perspective views illustrating a part of a steer-by-wire type steering apparatus according to the present embodiments.
Figure 3:
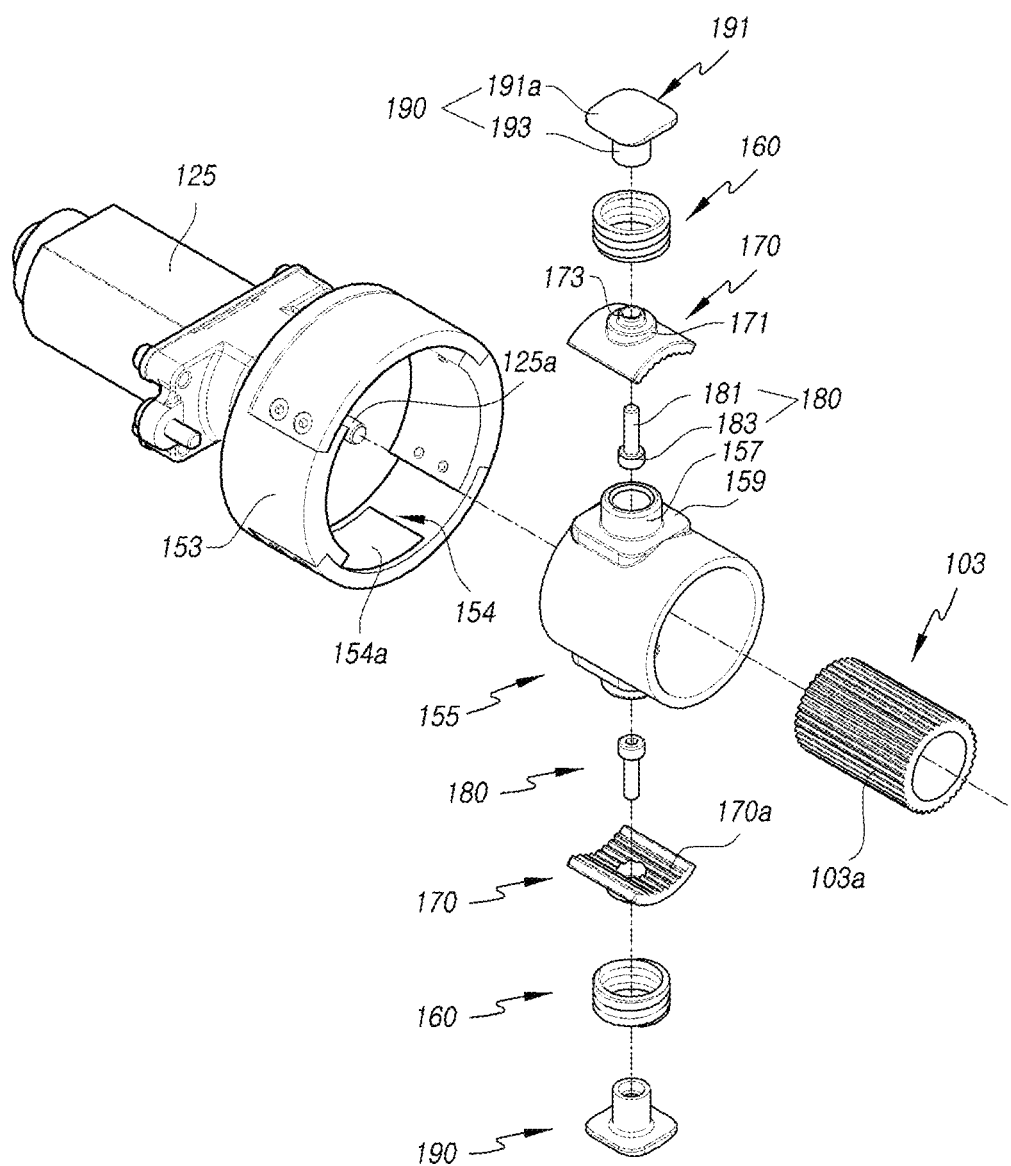
Figure 4:
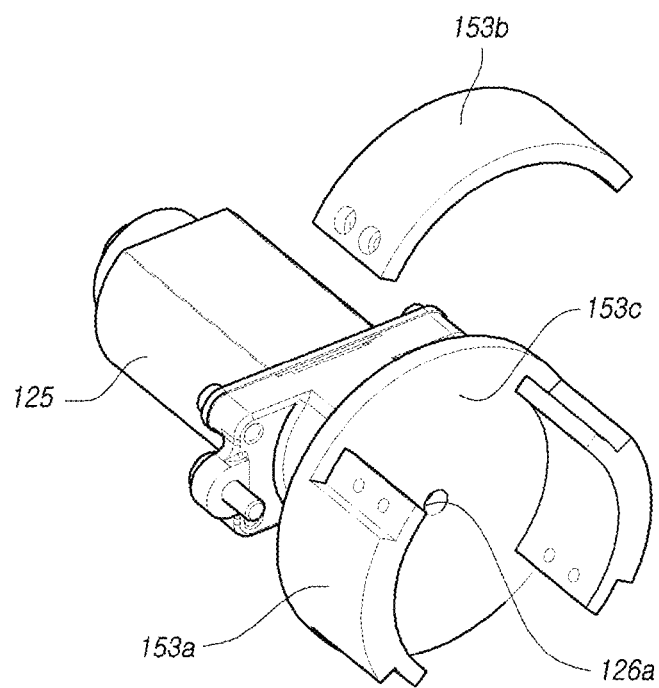
Figure 4:
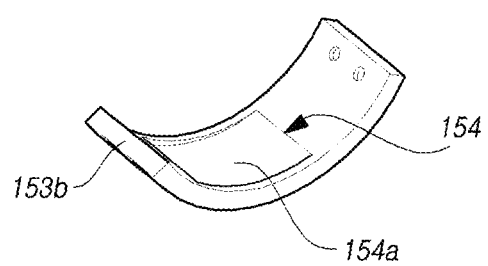

Hereinafter, some embodiments of the present disclosure will be described in detail through exemplary drawings. In adding reference numerals to elements of each drawing, the same elements may have the same numerals as possible even if they are indicated on different drawings. Further, in describing the present disclosure, detailed descriptions of related known configurations or functions may be omitted when it is determined that the description may make the subject matter in some embodiments of the present disclosure rather unclear.

In addition, terms, such as "first", "second", "A", "B", "(A)", "(B)", "(a)" or "(b)" may be used herein to describe elements of the disclosure. Each of these terms is not used to define essence, order or sequence, but is used merely to distinguish the corresponding element from other elements.

If a component is described as being "connected", "coupled" or "connected" to another component, it should be understood that the component may be directly connected or connected to that other component, but another component may be "connected", "coupled" or "connected" between each component.

Figure 5:
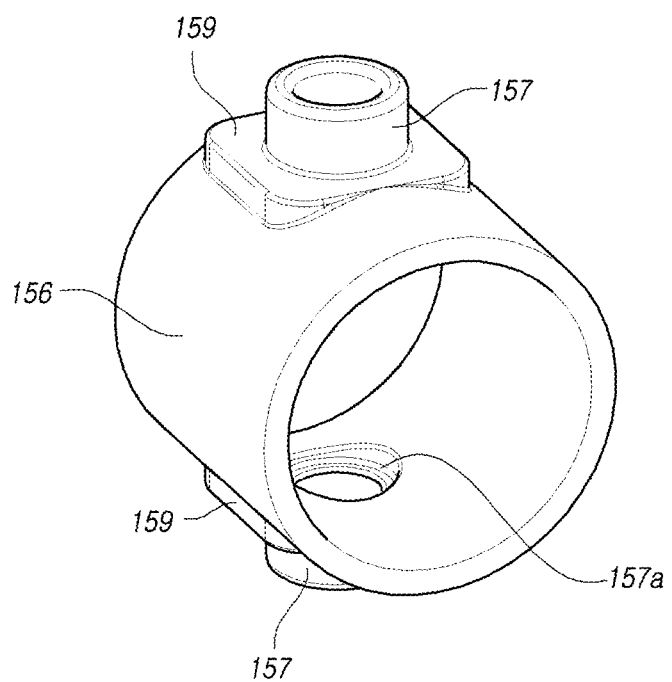
Figure 6:
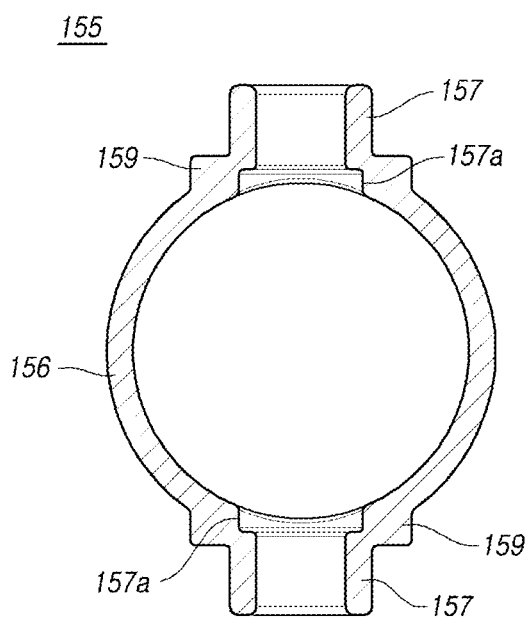
FIG. 6 is a cross-sectional view of FIG. 5.
Figure 7:
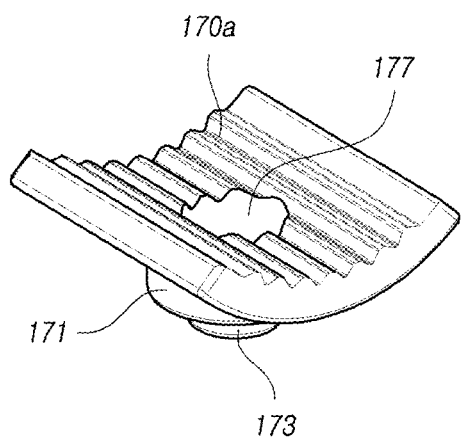
FIG. 7 is a perspective view illustrating a part of the steer-by-wire type steering apparatus according to the present embodiments.
Figure 8:
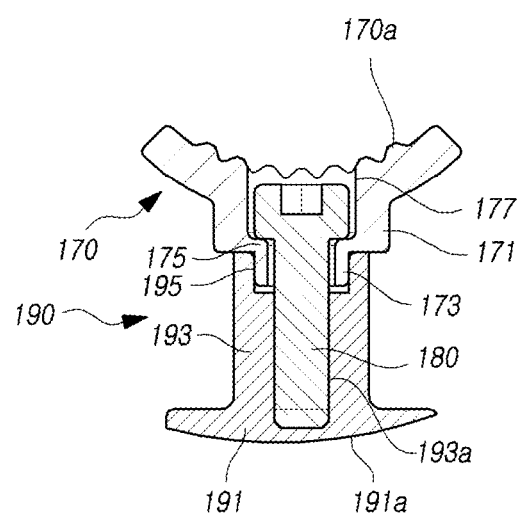
FIGS. 8 to 10 are cross-sectional views illustrating a part of the steer-by-wire type steering apparatuses according to the present embodiments.
Figure 9:
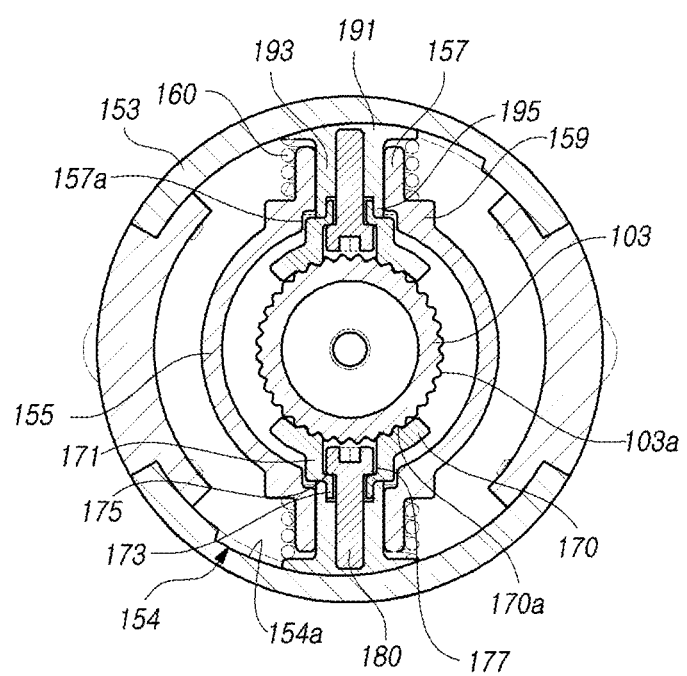
Figure 10:
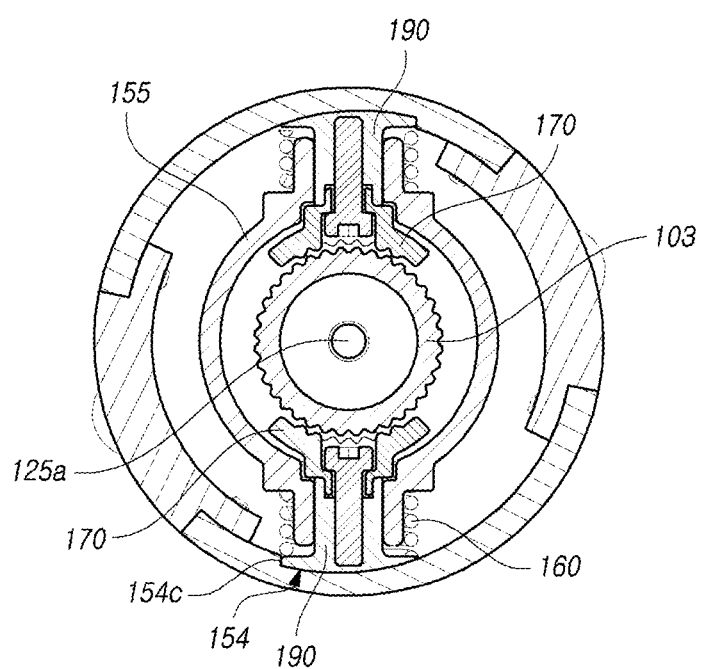

FIG. 1 is a schematic configuration diagram of a steer-by-wire type steering apparatus according to the present embodiments, FIGS. 2 to 5 are perspective views illustrating a part of a steer-by-wire type steering apparatus according to the present embodiments, FIG. 6 is a cross-sectional view of FIG. 5, FIG. 7 is a perspective view illustrating a part of the steer-by-wire type steering apparatus according to the present embodiments, and FIGS. 8 to 10 are cross-sectional views illustrating a part of the steer-by-wire type steering apparatuses according to the present embodiments.

As illustrated in the drawings, a steer-by-wire type steering apparatus according to the present embodiments includes an outer member 153 rotated by a driving motor 125 and provided with an oblique groove 154 formed on an inner circumferential surface, an inner member 155 formed in a cylindrical shape provided on an inner side spaced apart from the inner circumferential surface of the outer member 153, fixed to a steering column 123, and provided with a guide part 157 opened in a radial direction, a sliding member 190 whose outer surface is supported by the oblique groove 154 and is moved radially along the guide part 157 when the outer member 153 is rotated, and a support member 170 which is linked with the sliding member 190 to move in the radial direction and supports an outer circumferential surface of a steering shaft 103 to prevent rotation of the steering shaft 103.

In the steer-by-wire type steering apparatus according to the present embodiments, an angle sensor 105 and a torque sensor 107 are coupled to one side of the steering shaft 103 connected to a steering wheel 101, and the angle sensor 105 and the torque sensor 107, which detect an driver's operation of the steering wheel 101, transmit an electric signal to an electronic control device 110 so that a reaction force motor 120 and a pinion shaft motor 130 are operated.

The electronic control device 110 controls the reaction force motor 120, the driving motor 125, the pinion shaft motor 130, and the like based on the electric signals transmitted from the angle sensor 105, the torque sensor 107, the wheel rotation angle sensor 104 and the rack-bar movement sensor 106 and the electric signals transmitted from various sensors installed in the vehicle.

The pinion shaft motor 130 slides a rack bar 111 connected to the pinion shaft 113 to steer the wheels 119 on both sides through the tie rod 115 and the knuckle arm 117, and the reaction force motor 120 generates a steering reaction force in the opposite direction when the driver manipulates the steering wheel 101 or performs steering of the steering shaft 103 when the vehicle is autonomously driven.

Meanwhile, in the drawings in the present embodiments, it is illustrated that the angle sensor 105, the torque sensor 107, the wheel rotation angle sensor 104, and the rack bar movement sensor 106 are provided for convenience of description. However, of course, a motor position sensor for transmitting steering information to the electronic control device 110 and various radars, riders, camera image sensors, etc. may be provided, and a detailed description thereof will be omitted below.

In this steer-by-wire type steering apparatus, since the steering shaft 103 and the pinion shaft 113 are not mechanically connected and the driver's steering wheel 101 can be rotated indefinitely, a mechanical restrictions are required to stop the rotation of the steering shaft 103 at a specific angle.

That is, in the case that the rotation of the wheel 119 reaches the maximum point (when the steering wheel 101 or the wheel 119 is in a full-turn state in a general steering device), or in the case that the wheel 119 hits the curb of the road and can no longer rotate, since the reaction force motor 120 outputs the reaction torque to the maximum, the steering shaft 103 is prevented from rotating any more, thereby preventing the rotation of the steering shaft 103 so that such information can be provided to the driver.

In order to prevent the rotation of the steering shaft 103, a drive motor 125 mechanically connected to the steering shaft 103 is provided, and in the case that the rotation of the wheel 119 reaches the maximum point or a steering torque greater than the maximum reaction torque of the reaction motor 120 generates, a rotation preventing member 150 is operated to stop the rotation of the steering shaft 103.

The steering column fixed to the vehicle body of the vehicle is provided with a steering shaft 103 coupled to the steering wheel 101, and at one side of the steering column 123, it is provided with a reaction force motor 120 for providing a feeling of steering reaction force to the steering shaft 103, and a drive motor 125 operated to stop the rotation of the steering shaft 103 when a steering torque greater than the maximum reaction torque of the reaction motor 120 is generated in the steering shaft 103.

Therefore, if the driver manipulates the steering wheel 101, the electronic control device 110 operates the reaction force motor 120 based on the signal values detected by the torque sensor 107 and the angle sensor 105 to generates a reaction torque that operates in a direction opposite to the rotational direction of the steering shaft 103.

In addition, in the case that rotation of the wheel 119 reaches the maximum point (the case in which the steering wheel 101 or the wheel 119 is in a full-turn state in a general steering apparatus), or in the case that the wheel 119 hits the curb of the road and cannot rotate anymore, the driving motor 125 is operated to rotate the outer member 153.

The outer member 153 is formed in a cylindrical shape with one end closed by a partition wall 153c, and outer circumferential surface thereof is supported by a housing 152 and rotates, and a housing cover 151 is mounted on the outside of the housing 152.

In addition, an oblique groove 154 is formed on the inner circumferential surface of the outer member 153 and is rotated to one side and the other side by a driving motor 125 coupled to the partition wall 153c.

The outer member 153 may be formed integrally, but may be divided and assembled in consideration of manufacturability and assembly.

That is, the oblique groove 154 may be formed by separately forming the portion 153b provided with the oblique groove 154 and combined with a cylindrical portion 153a with a fixing member, and in this case, the oblique groove 154 may be more easily formed and a mold manufacturing may be simple. In the present embodiments, it has been illustrated the outer member 153 is divided and assembled as an example.

The inner member 155 formed in a cylindrical shape is provided with a guide part 157 opened in the radial direction on one side, and is disposed inside spaced apart from the inner circumferential surface of the outer member 153.

In the inner member 155, the cylindrical portion 156 is fixed to the steering column so as not to move when the outer member 153 rotates, and may be fixed to a fixed component such as an outer tube of a steering column, a column housing, or a bracket. A detailed description of this will be omitted.

Furthermore, during the outer member 153 rotates, the outer surface of the sliding member 190 is supported by the oblique groove 154 and moves radially inward along the guide part 157 and supports the support member 170.

The support member 170 is linked with the sliding member 190, moves in the radial direction and supports the outer circumferential surface of the steering shaft 103 to prevent rotation of the steering shaft 103.

The oblique groove 154 provided in the outer member 153 is provided at a position corresponding to the guide part 157 of the inner member 155, and is formed as an oblique surface in which the depth in the radial direction gradually increases from the inner circumferential surface of the outer member 153 toward one side in a circumferential direction.

Therefore, when the outer member 153 is rotated by the driving motor 125, the sliding member 190 supported by the oblique groove 154 moves in the radial direction by a difference in depth of the oblique groove 154.

A coating portion 154a formed of a low friction material may be formed on a surface of the oblique groove 154 or a low friction member may be coupled to the surface of the oblique groove. In the drawings of the present embodiments, for convenience, it has been illustrated the case in which the coating portion 154a is formed as an example.

An outer circumferential surface of the sliding member 190 supported by the oblique groove 154 of the outer member 153 is formed in a convex curved surface to be supported in close contact with the oblique groove 154, and is moved in the radial direction when the outer member 153 rotates.

In addition, on an outer circumferential surface of the sliding member 190 supported by the oblique groove 154, a coating portion 191a formed of a low friction material is formed, or a low friction member is coupled, so that the sliding member can be smoothly moved without being caught while minimizing friction with the oblique groove 154. Similar to the oblique groove 154, in the drawings of the present embodiments, for convenience, it has been illustrated the case in which the coating portion 191a is formed as an example.

Herein, the coating portion provided on the oblique groove 154 or the sliding member 190 may be formed of a non-adhesive, low friction material such as polytetrafluoroethylene (PTFE).

In addition, the partition wall 153c formed at the axial end of the outer member 153 is provided with a coupling hole 126a to which the shaft 125a of the driving motor 125 is coupled, so as to be coupled with the driving motor 125 and rotate.

The guide part 157 formed on the inner member 155 is formed in a hollow shape protruding radially outward from the outer circumferential surface of the inner member 155, which enable the sliding member 190 to move to the inside of the guide part 157 while the outer member 153 rotates.

The sliding member 190 includes a body portion 193 inserted into the guide part 157, and a support end portion 191 protruding from an outer end of the body portion to both sides in a circumferential direction.

In addition, an elastic member 160, which supports the sliding member 190 in the radial direction, is coupled to an outer circumferential surface of the guide part 157 and the support end portion 191. Since the elastic member 160 supports the support end 191 and supports the sliding member 190 toward the outer member 153, in normal state, that is, when the steering shaft 103 rotates, the sliding member 190 separates the support member 170 from the steering shaft 103.

Further, a protruding end portion 159 for supporting the elastic member 160 is formed at a portion where the outer circumferential surface of the inner member 155 and the guide part 157 are connected, so that a rattle noise with the inner member 155 is prevented while supporting the end of the elastic member 160.

Meanwhile, a support fixing portion 170a formed of a protrusion and a groove is provided on an inner circumferential surface of the support member 170, and a shaft fixing portion 103a formed of a groove and protrusion corresponding to the support fixing portion 170a is provided on the outer circumferential surface of the steering shaft 103, so that the rotation of the steering shaft 103 is securely prevented.

In this case, the support fixing portion 170a and the shaft fixing portion 103a are illustrated as having protrusions and grooves formed in the axial direction, but this is illustrated as an example and is not necessarily limited thereto. These may be formed in any shape that can prevent the rotation of the steering shaft 103.

A radial protrusion 171 protruding radially outward is formed on an outer circumferential surface of the support member formed in an approximately circular or arc-shaped cross section, and a seating groove 157a in which the radial protrusion 171 is seated is formed on the inner circumferential surface of the opened portion of the inner member 155.

In addition, the support member 170 includes an insertion portion 173 protruding radially outwardly on an outer circumferential side of the radial protrusion 171, and the sliding member 190 includes an insertion groove 195 into which the insertion portion 173 is inserted so as to be coupled to the support member 170.

The sliding member 190 and the support member 170 are connected by a fastening member penetrating 180 the support member 170 and the sliding member 190 so as to be able to integrally move in the radial direction.

A connection hole 193a to which the fastening member 180 is coupled is formed in the body 193 of the sliding member 190, and the support member 170 is formed with a fastening hole 177 penetrating from the support fixing portion 170a to the insertion portion 173.

In addition, a stepped portion 175 for supporting the head portion 183 of the fastening member 180 is formed inside the radial protrusion 171, and the body portion 181 of the fastening member 180 is coupled to the connection hole 193a of the sliding member 190, so that the fastening member 180 may be fixed while connecting the sliding member 190 and the support member 170.

Meanwhile, the guide part 157 formed in the inner member 155 may be spaced apart in the circumferential direction of the inner member 155 and may be provided with two or more, and the sliding member 190 and the support member 170 may be also provided corresponding to each of the guide parts 157.

That is, in order to more efficiently prevent the rotation of the steering shaft 103, two or more guide parts 157, sliding members 190, elastic members 160, and support members 170 may be provided at positions spaced apart in the circumferential direction among positions supporting the outer circumferential surface of the steering shaft 103. In the present embodiments, it has been illustrated as an example that they are provided at positions opposite to each other in the radial direction.

A steer-by-wire type steering apparatus according to the present embodiments may further include a torque sensor 107 for measuring a steering torque value generated by the steering shaft, and an electronic control device 110 for calculating and transmitting a reaction force torque value of the steering shaft 103 to a reaction force motor 120, and for determining whether to operate the driving motor 125 by comparing the steering torque value with a preset maximum reaction force torque value.

In this case, if the steering torque value generated by the steering shaft 103 is greater than a preset maximum reaction torque value, the electronic control device 110 operates the driving motor 125 so that the support member 170, as shown in FIG. 9, is in close contact with the steering shaft 103

In addition, if the steering torque value generated by the steering shaft 103 is less than a preset maximum reaction torque value, the electronic control device 110 operates the driving motor 125 so that, as shown in FIG. 10, the support member 170 maintains a state spaced apart from the steering shaft 103 to enable free rotation of the steering shaft 103.

That is, in the case of a normal steering situation, the driving motor 125 rotates the outer member 153, as shown in FIG. 10, so that the support member 170 is positioned at the deepest locking projection 154c of the oblique groove 154. Therefore, the support member 170 is spaced apart from the steering shaft 103 to enable free rotation of the steering shaft 103.

Further, in the case that the driver generates a steering torque exceeding the reaction torque of the reaction force motor 120 in the steering shaft 103, such as the case in which the wheel rotation reaches maximum point during steering or the case in which the wheel hits the curb of the road and can no longer rotate, the driving motor 125 rotates the outer member 153 in opposite direction, so that the support member 170 is located to the shallowest of the oblique groove 154 as shown in FIG. 9. Therefore, the support member 170 is in close contact with the steering shaft 103, and the rotation of the steering shaft 103 is prevented.

In addition, if the steering torque value in any one direction, for example, in the left rotation direction is greater than the maximum reaction force torque value, the rotation of the steering shaft 103 is prevented. At this time, if a steering torque value in the right rotation direction is generated, the driving motor 125 is operated to rotate the outer member 153 in the opposite direction, so that the steering shaft 103 can be rotated again.

Further, a steer-by-wire type steering apparatus according to the present embodiments may further include an angle sensor 105 measuring a rotation angle of the steering shaft 103, a wheel rotation angle sensor 104 for measuring a rotation angle of a wheel, and an electronic control device 110 for determining whether to operate the driving motor 125 by comparing the rotation angle of the steering shaft measured by the angle sensor 105 and the rotation angle of the wheel measured by the wheel rotation angle sensor 104 with a preset data value.

In this case, the electronic control device 110 determines whether to operate the driving motor 125 by comparing the rotation angle of the steering shaft 103 and the rotation angle of the wheel with a preset data value. Herein, the preset data value means a data value set as a wheel rotation angle corresponding to the rotation angle of the steering shaft 103 during general steering.

Therefore, by comparing the rotation angle of the steering shaft 103 and the rotation angle of the wheel with a preset data value, in the case that the rotation angle of the steering shaft 103 is greater than the preset data value of the wheel rotation angle including the case in which the wheel rotation reaches maximum point during steering or the case in which the wheel hits the curb of the road and can no longer rotate, the driving motor 125 is controlled to rotates the outer member 153 so that the support member 170 is in close contact with the steering shaft 103 as shown in FIG. 9.

In addition, in the case that the rotation angle of the steering shaft 103 is less than the preset data value of the wheel rotation angle, the driving motor 125 may be operated so that the support member 170 is maintained spaced apart from the steering shaft 103, as shown in FIG. 10, to enable free rotation of the steering shaft 103.

In addition, a steer-by-wire type steering apparatus according to the present embodiments may further include an angle sensor 105 measuring a rotation angle of the steering shaft 103, a rack bar movement sensor 106 measuring a sliding movement distance of a rack bar 111, and an electronic control device 110 for determining whether to operate the driving motor 125 by comparing the rotation angle of the steering shaft measured by the angle sensor 105 and the movement distance of the rack bar measured by the rack bar movement sensor 106 with a preset data value.

In this case, the electronic control device 110 determines whether to operate the driving motor 125 by comparing the rotation angle of the steering shaft 103 and the movement distance of the rack bar with a preset data value, and the preset data value means a data value set as the movement distance of the rack bar corresponding to the rotation angle of the steering shaft 103 during general steering.

Therefore, by comparing the rotation angle of the steering shaft 103 and the movement distance of the rack bar with a preset data value, in the case that the rotation angle of the steering shaft 103 is greater than the preset data value of the movement distance of the rack bar including the case in which the wheel rotation reaches maximum point during steering or the case in which the wheel hits the curb of the road and can no longer rotate, the driving motor 125 is controlled to rotates the outer member 153 so that the support member 170 is in close contact with the steering shaft 103 as shown in FIG. 9.

In addition, in the case that the rotation angle of the steering shaft 103 is less than the preset data value of the movement distance of the rack bar, the driving motor 125 may be operated so that the support member 170 is maintained spaced apart from the steering shaft 103, as shown in FIG. 10, to enable free rotation of the steering shaft 103.

That is, according to the direction in which the electronic control device 110 operates the driving motor 125 to rotate the outer member 153, it is possible to disable only one direction of rotation of the steering shaft 103.

As described above, according to the present embodiments, in a steer-by-wire type steering apparatus, in the case that the rotation of the wheel reaches the maximum point or the driver generates a steering torque exceeding the reaction torque of the reaction force motor on the steering shaft, it is possible to prevent the rotation of the steering shaft, thereby improving the driver's steering feeling and steering stability.

In the above, even if all the components constituting the embodiments of the present embodiments are described as being combined into one or operating in combination, the present embodiments are not necessarily limited to these embodiments. That is, as long as it is within the scope of the object of the present embodiments, one or more of the components may be selectively combined and operated.

The above description provides an example of the technical idea of the present disclosure for illustrative purposes only, and any person ordinary skilled in the art including the present disclosure will be able to make various modifications and variations within the scope not departing from the essential characteristics of the present disclosure. Therefore, the embodiments disclosed in the present disclosure are not intended to limit the technical concept of the present disclosure, but to describe, and the scope of the technical idea of the present disclosure is not limited by these embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

This patent application claims priority in accordance with Article 119(a) of the U.S. Patent Law (35 USC § 119(a)) for Patent Application No. 10-2018-0124691 filed in Korea on Oct. 18, 2018, which all contents are incorporated into this patent application by reference. In addition, if this patent application claims priority for countries other than the United States for the same reason as above, all the contents are incorporated into this patent application as references.

The invention claimed is:

1. A steer-by-wire type steering apparatus comprising:
an outer member rotated by a driving motor and provided with an oblique groove formed on an inner circumferential surface;
an inner member formed in a cylindrical shape provided on an inner side of the outer member, fixed to a steering column, and provided with a guide part opened in a radial direction;
a sliding member whose outer surface is supported by the oblique groove and is moved radially along the guide part when the outer member is rotated; and
a support member which is linked with the sliding member to move in the radial direction and supports an outer circumferential surface of a steering shaft to prevent rotation of the steering shaft.

2. The steer-by-wire type steering apparatus of claim 1, wherein the oblique groove is provided at a position corresponding to the guide part, and is formed as an inclined surface in which the depth in the radial direction gradually increases from the inner circumferential surface of the outer member toward one side in a circumferential direction.

3. The steer-by-wire type steering apparatus of claim 2, wherein a coating portion formed of a low friction material is formed on a surface of the oblique groove or a low friction member is coupled to the surface of the oblique groove.

4. The steer-by-wire type steering apparatus of claim 2, wherein an outer circumferential surface of the sliding member supported by the oblique groove is formed in a convex curved surface.

5. The steer-by-wire type steering apparatus of claim 4, wherein a coating portion formed of a low friction material is formed on an outer circumferential surface of the sliding member supported by the oblique groove, or a low friction member is coupled to the outer circumferential surface of the sliding member supported by the oblique groove.

6. The steer-by-wire type steering apparatus of claim 1, wherein a shaft of the driving motor is coupled to an axial end of the outer member.

7. The steer-by-wire type steering apparatus of claim 1, wherein the guide part protrudes radially outward from an outer circumferential surface of the inner member and is formed in a hollow shape.

8. The steer-by-wire type steering apparatus of claim 7, wherein the sliding member includes a body portion inserted into the guide part, and a support end portion protruding from an outer end of the body portion to both sides in a circumferential direction and supported by the oblique groove.

9. The steer-by-wire type steering apparatus of claim 8, wherein an elastic member, which is supported on the support end portion and supports the sliding member in the radial direction, is coupled to an outer circumferential surface of the guide part.

10. The steer-by-wire type steering apparatus of claim 9, wherein a protruding end portion for supporting the elastic member is formed at a portion where the outer circumferential surface of the inner member and the guide part are connected.

11. The steer-by-wire type steering apparatus of claim 1, wherein a support fixing portion formed of at least one protrusion and groove is provided on an inner circumferential surface of the support member.

12. The steer-by-wire type steering apparatus of claim 11, wherein a shaft fixing portion, which is formed of a groove and protrusion corresponding to the support fixing portion, is provided on the outer circumferential surface of the steering shaft.

13. The steer-by-wire type steering apparatus of claim 1, wherein a radial protrusion protruding radially outward is formed on an outer circumferential surface of the support member, and a seating groove in which the radial protrusion is seated is formed on an inner circumferential surface of the inner member.

14. The steer-by-wire type steering apparatus of claim 13, wherein the support member includes an insertion portion protruding radially outwardly on an outer circumferential side of the radial protrusion, and the sliding member includes an insertion groove into which the insertion portion is inserted.

15. The steer-by-wire type steering apparatus of claim 14, wherein the sliding member and the support member are connected by a fastening member penetrating the sliding member and the support member.

16. The steer-by-wire type steering apparatus of claim 15, wherein a stepped portion for supporting the head of the fastening member is formed inside the radial protrusion.

17. The steer-by-wire type steering apparatus of claim 1, wherein the guide part is spaced apart in the circumferential direction of the inner member and is provided with two or more, and the sliding member and the support member are also provided at positions corresponding to each of the guide parts.

18. The steer-by-wire type steering apparatus of claim 11, further comprising:
a torque sensor that measures a steering torque value generated by the steering shaft; and
an electronic control device for calculating and transmitting a reaction force torque value of the steering shaft to a reaction force motor, and for determining whether to operate the driving motor by comparing the steering torque value with a preset maximum reaction force torque value.

19. The steer-by-wire type steering apparatus of claim 1, further comprising:
an angle sensor measuring a rotation angle of the steering shaft;
a wheel rotation angle sensor for measuring a rotation angle of a wheel; and an electronic control device for determining whether to operate the driving motor by comparing the rotation angle of the steering shaft measured by the angle sensor and the rotation angle of the wheel measured by the wheel rotation angle sensor with a preset data value.

20. The steer-by-wire type steering apparatus of claim 1, further comprising:
an angle sensor measuring a rotation angle of the steering shaft;
a rack bar movement sensor measuring a sliding movement distance of a rack bar; and
an electronic control device for determining whether to operate the driving motor by comparing the rotation angle of the steering shaft measured by the angle sensor and the movement distance of the rack bar measured by the rack bar movement sensor with a preset data value.

* * * * *